(No Model.)
J. E. BROOKS.
SLIDING FISH PLATE.
No. 576,024. Patented Jan. 26, 1897.
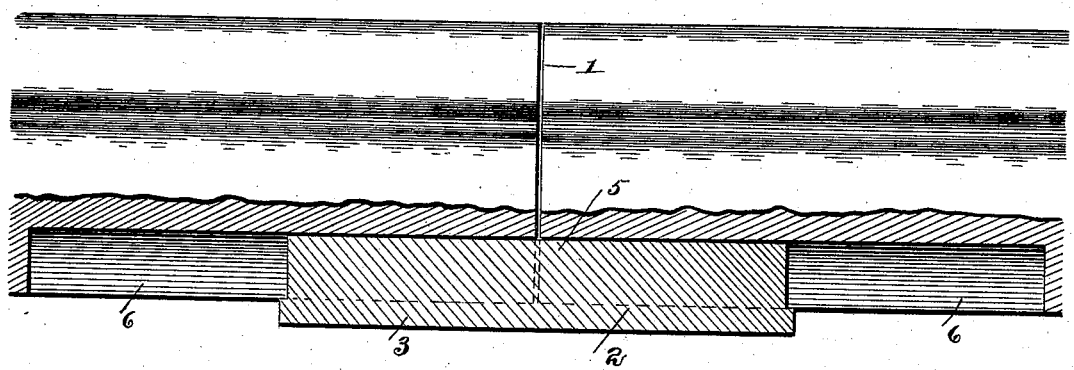
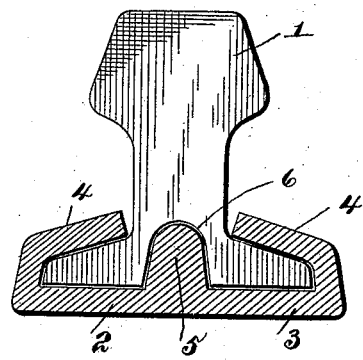
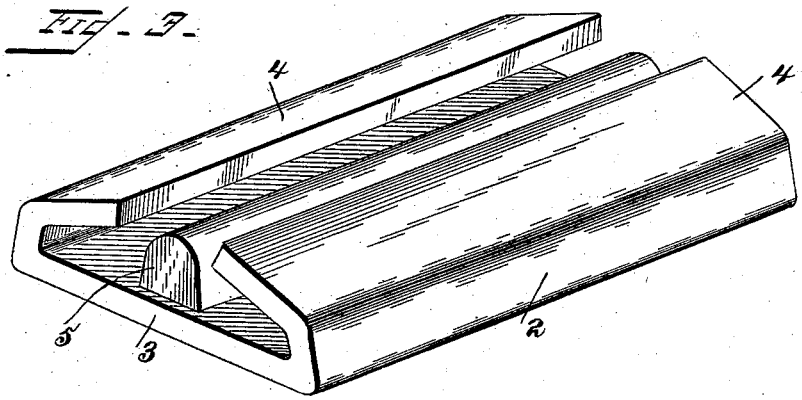
WITNESSES
Marcus L. Byng.
Edw. S. Falk.
INVENTOR,
John E. Brooks.
by John Wedderburn
Attorney

UNITED STATES PATENT OFFICE.

JOHN ELIJAH BROOKS, OF CALUMET, PENNSYLVANIA.

SLIDING FISH-PLATE.

SPECIFICATION forming part of Letters Patent No. 576,024, dated January 26, 1897.

Application filed September 5, 1896. Serial No. 604,995. (No model.)

*To all whom it may concern:*

Be it known that I, JOHN ELIJAH BROOKS, a citizen of the United States, residing at Calumet, in the county of Westmoreland and State of Pennsylvania, have invented certain new and useful Improvements in Sliding Fish-Plates; and I do hereby declare the following to be a full, clear, and exact description of the invention, such as will enable others skilled in the art to which it appertains to make and use the same.

This invention relates to a novel construction in a fish-plate for joining the ends of railroad-rails; and it consists in the features of construction hereinafter described and claimed.

In the accompanying drawings, Figure 1 is a longitudinal section of the meeting ends of two rails with my invention applied thereto. Fig. 2 is a cross-section of the same. Fig. 3 is a perspective view of the fish-plate.

In said drawings, 1 indicates the end portion of a rail, and 2 the fish-plate. Said fish-plate has a base portion 3 and inwardly-turned side flanges 4, that are adapted to receive the flanges of the rail, it being noted that the base 3 and flanges 4 are of such dimensions that they fit closely upon the rail, while at the same time they can slide thereon. The base 3 is provided on its upper face and in the center of the same with a longitudinal rib 5, that is adapted to enter the longitudinal groove 6 in the bottom of the rail. The length of the groove 6 in the rail is about the length of the fish-plate, so that when joining the ends of the said rails said fish-plate can be first slid along the rail to permit the ends to be brought together, after which it can be moved to overlap both ends.

It will be seen from the foregoing description that I provide a fish-plate for joining railroad-rails that is made in one piece and which effectually couples the ends of the rails without the use of bolts, and hence can be quickly applied or removed. It is also advantageous in repairing tracks, as the joint can be uncoupled speedily, as will be obvious.

Having thus described my invention, what I claim as new, and desire to secure by Letters Patent, is—

1. A fish-plate consisting of a base having upturned and inwardly-extending or overhanging side flanges along the side edges and a longitudinal rib between said flanges, substantially as described.

2. The combination, with the meeting ends of railroad-rails having longitudinal grooves in their lower faces, and a fish-plate for coupling said ends consisting of a base having upturned side flanges embracing the flanges of the rail and a longitudinal rib situated within said longitudinal grooves, substantially as described.

In testimony whereof I have signed this specification in the presence of two subscribing witnesses.

JOHN ELIJAH BROOKS.

Witnesses:
W. M. McCALISTER,
EDWIN WILLIAMS.